United States Patent [19]
Kowall et al.

[11] Patent Number: 5,871,276
[45] Date of Patent: *Feb. 16, 1999

[54] MULTIDIRECTIONAL HEADLAMP MOUNT WITH MANUALLY ADJUSTABLE ELEVATION ANGLE

[75] Inventors: David J. Kowall, Hartland; Del C. Schroeder, Bloomfield Hills; Delbert D. DeRees, Romeo, all of Mich.

[73] Assignee: Chrysler Corporation, Auburn Hills, Mich.

[*] Notice: The term of this patent shall not extend beyond the expiration date of Pat. No. 5,639,155.

[21] Appl. No.: 876,372

[22] Filed: Jun. 16, 1997

Related U.S. Application Data

[63] Continuation of Ser. No. 545,979, Oct. 20, 1995, Pat. No. 5,639,155.

[51] Int. Cl.$^6$ .................................................. B60Q 1/068
[52] U.S. Cl. .......................... 362/529; 362/233; 362/271; 362/428; 362/549
[58] Field of Search ............................. 362/66, 233, 238, 362/285, 287, 289, 418–420, 427, 428, 269, 271, 523, 524, 529, 549, 368, 370, 371

[56] References Cited

U.S. PATENT DOCUMENTS

| | | | |
|---|---|---|---|
| 1,263,750 | 4/1918 | Dolan | 362/420 |
| 1,278,974 | 9/1918 | Meyer | 362/233 |
| 1,494,500 | 5/1924 | Parker et al. | 362/233 |
| 1,534,869 | 4/1925 | Rorick et al. | 362/66 |
| 4,110,819 | 8/1978 | Ishikawa | 362/66 |
| 4,709,306 | 11/1987 | Harris et al. | 362/68 |
| 5,639,155 | 6/1997 | Kowall et al. | 362/66 |

*Primary Examiner*—Alan Cariaso

[57] ABSTRACT

A headlamp mounting system for an automobile includes respective headlamp housings for holding monofilament headlamps. Also, respective bases are attached to the automobile and each base is pivotably engaged with a respective one of the headlamp housings. An activating shaft extends between the headlamp housings and is connected to each, and an activating rod is connected to a radially protruding ear of the activating shaft. The activating rod is coupled to an operating knob in the passenger compartment, and the knob can be pushed and pulled as desired by an occupant to cause the activating rod to reciprocate and, thus, to rotate the activating shaft and hence pivot the headlamp housings. Thereby, the elevation angle of the headlamp beams is selectively established, with a high angle establishing a high beam orientation and a low angle establishing a low beam orientation. A spool having front and rear ends is pivotably engaged with the activating rod in the passenger compartment. The high beam orientation is established when the front end abuts the automobile and the low beam orientation is established when the rear end abuts the automobile, thereby establishing the limit of travel of the activating rod. The spool can be rotated on the rod as desired to vary the high beam and low beam orientations.

10 Claims, 3 Drawing Sheets

MULTIDIRECTIONAL HEADLAMP MOUNT WITH MANUALLY ADJUSTABLE ELEVATION ANGLE

RELATED APPLICATIONS

This is a continuation of U.S. patent application Ser. No. 08/545,979, filed Oct. 20, 1995 U.S. Pat. No. 5,639,155.

This patent application is related to commonly-assigned U.S. patent application Ser. No.: [95-1836] for an invention entitled "METHOD AND APPARATUS FOR ATTACHING COMPOSITE PLASTIC AUTOMOBILE BODY TO STEEL AUTOMOBILE FRAME", incorporated herein by reference.

FIELD OF INVENTION

The present invention relates generally to automobiles, and more particularly to headlamps for lightweight, cost-effective automobiles.

BACKGROUND OF THE INVENTION

As is well known, consumers demand a choice between many different models of automobiles. Depending on the circumstances, some consumers might desire a simple yet effective automobile, with the principal and indeed overriding consideration being cost. With this in mind, the present invention recognizes that it is possible to provide an effective and useful automobile, the cost of which can be minimized by minimizing the weight of the automobile and by using the novel structure disclosed herein.

More specifically, the present invention recognizes that the cost of an automobile can be minimized by minimizing the weight of the automobile. This is because a lightweight automobile, among other things, can be propelled by a relatively small, fuel-efficient power plant. Additionally, certain lightweight materials happen to be inexpensive, and easy to manufacture.

As further recognized by the present invention, it is advantageous to further reduce the weight and expense of such an automobile by providing effective yet inexpensive automotive subsystems, such as headlamp systems, for use in conjunction with the automobile. While existing headlamp systems are effective, many existing systems include metal mounting components and consequently are relatively heavy. Moreover, many existing systems provide high and low head beams by incorporating two separate bulb filaments, thus requiring the use of headlamps which are relatively expensive vis-a-vis single filament bulbs. While it is desirable to provide high and low head beams, it can be appreciated in light of the discussion above that the cost of the subsystems intended for use in the present automobile preferably is minimized.

Still further, the elevation angle of the head beams of existing automobile headlamp systems can be adjusted, if at all, only by using an appropriate tool to manipulate adjusting screws that are located on the headlamp housings. As recognized by the present invention, however, while such adjusting means ordinarily are sufficient for relatively heavy metal-bodied automobiles, a more convenient and less cumbersome means for adjusting the head beam elevation angle is desirable in plastic-bodied automobiles. This is because, as recognized herein, the pitch angle of a lightweight plastic-bodied automobile, when transporting little weight, can vary markedly from the pitch angle of the automobile when, e.g., the rear trunk of the lightweight automobile supports a heavy load. The present invention further recognizes that in a lightweight plastic-bodied automobile, the potentially large variation in the pitch angle of the automobile can require relatively frequent adjustment of the head beam elevation angle. For this reason, it is desirable to provide an easier and more convenient means than is currently available for adjusting the elevation angle of a head beam.

Accordingly, it is an object of the present invention to provide a lightweight, inexpensive headlamp mount for a plastic-bodied automobile. Another object of the present invention is to provide a headlamp mount for an automobile which is easy to use and cost-effective to manufacture. Yet another object of the present invention is to provide a means for adjusting the elevation angle of the head beam of an automobile which is convenient, and which can be operated from the passenger compartment of the automobile. Still another object of the present invention is to provide a high beam and a low beam in an automobile headlamp system having single-filament, comparatively inexpensive bulbs.

SUMMARY OF THE INVENTION

A mount for holding a headlamp of an automobile having a headlamp support element includes a headlamp housing for holding the headlamp. The headlamp housing defines a light beam axis. A base is formed with a clamp for engaging the headlamp support element, and the base is also formed with a support for pivotably engaging the headlamp housing. An actuator is coupled to the headlamp housing and is reciprocatingly disposed on the automobile for transforming translational motion of the actuator to pivotal motion of the headlamp housing. Consequently, the actuator can be moved to pivot the headlamp housing to a low beam orientation, wherein a first elevation angle is established between the light beam axis and the ground directly beneath the mount, and a high beam position, wherein a second elevation angle is established between the light beam axis and the ground directly beneath the mount.

Preferably, the second elevation angle is higher than the first elevation angle, and the headlamp housing and base are made of injection-molded plastic. In a preferred embodiment, the headlamp support element is a frame rail of the automobile, and the clamp of the base is a bracket having first and second clamping legs for straddling the frame rail therebetween. In accordance with the present invention, the first and second clamping legs define respective first and second clamping surfaces, with each clamping surface being oriented toward the frame rail.

As intended by the present invention, the clamp defines a yaw angle relative to the frame rail. The clamping legs are materially biased to establish an interference fit between the clamp of the base and the frame rail, and each clamping surface is formed with a respective non-planar clamping rib which abuts the frame rail to permit selectively establishing the yaw angle. At least one fastener is engaged with the clamp and the frame rail to inhibit relative motion between the clamp and frame rail and thereby maintain the yaw angle.

In the preferred embodiment, the support of the base generally defines a semicircle having two ends terminating in respective channels. Advantageously, the headlamp housing is formed with opposed dowels for rotatably engaging respective channels.

In a most preferred embodiment, the actuator includes an activating rod and an activating shaft that is connected to the headlamp housing. An ear is formed on the activating shaft, and the ear extends radially away from the shaft. As disclosed in detail below, the ear is connected to the activating rod such that translational motion of the activating rod is transformed to rotational motion of the activating shaft and headlamp housing. Desirably, a sheath is disposed around at least a segment of the activating rod.

In another aspect of the present invention, a mounting system is disclosed for selectively establishing an elevation angle of first and second single-filament automobile headlamps. The system of the present invention includes first and second headlamp holders attached to the automobile for respectively pivotably holding the first and second headlamps. Moreover, the system includes an activating rod which is coupled to the first and second holders and which is movable by an occupant of the automobile to move the holders between a low beam orientation, wherein a first elevation angle is established between the headlamps and the ground, and a high beam position, wherein a second elevation angle is established between the headlamps and the ground.

In yet another aspect of the present invention, a method for selectively establishing the elevation angle of a headlamp relative to an automobile from inside a passenger compartment of the automobile includes attaching the headlamp to a headlamp housing. The method further includes pivotably engaging the headlamp housing with a base, and attaching the base to the automobile. An operating member is coupled to the headlamp housing, and then is selectively manipulated from inside the passenger compartment to pivot the headlamp housing relative to the base. Thereby, a desired elevation angle of the headlamp relative to the automobile is established.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
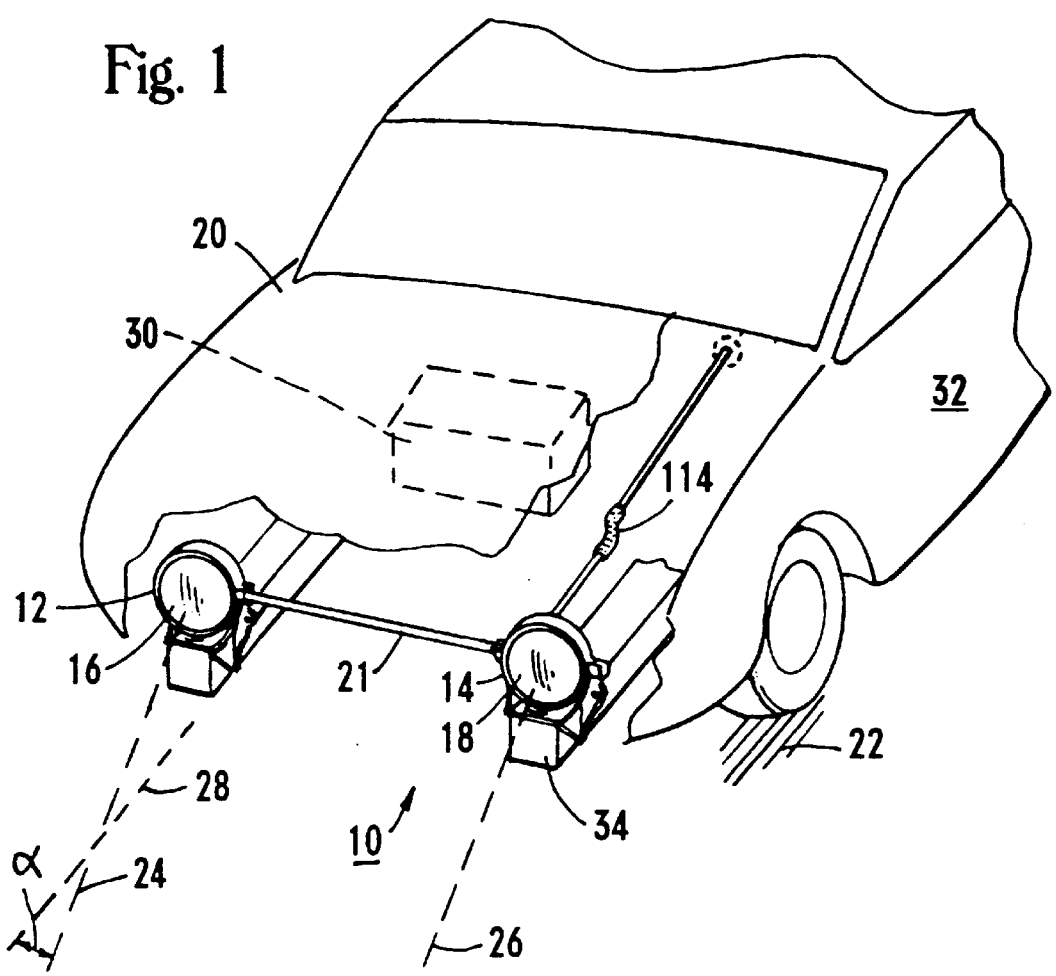
FIG. 1 is a perspective view of the automobile headlamp mounting system of the present invention, shown in operable engagement with a lightweight plastic-bodied automobile, with portions cut away for clarity.

Referring initially to FIG. 1, a headlamp mounting system is shown, generally designated 10, which includes right and left headlamp holders 12, 14 for pivotably holding respective right and left single filament automobile headlamps 16, 18 on an automobile 20. As disclosed in detail below, the system 10 includes an operating member 21 which is coupled to the holders 12, 14 to permit selectively establishing an elevational angle α between ground 22 that is directly beneath the automobile 20 and light beam axes 24, 26 which are respectively defined by the headlamps 16, 18. It will be understood that the elevational angle α is taken in a plane perpendicular to a generally horizontally-oriented frame 34 of the automobile 20, and hence alternatively may be referred to as a "pitch" angle.

In accordance with the present invention, the elevation angle α is established to be relatively high to thereby establish a high beam orientation of the headlamps 16, 18. On the other hand, the elevation angle α is established to be relatively low to thereby establish a low beam orientation of the headlamps 16, 18.

As used herein, the terms "high" and "low" as applied to the elevation angle α are referenced to a longitudinal axis 28 of the automobile 20. For example, when the beams from the headlamps 16, 18 are directed toward the ground, the elevation angle α is "low"; indeed, it is negative. On the other hand, when the beams from the headlamps 16, 18 are directed upwardly above the horizon, the elevation angle α is positive and, thus, is "higher" than a negative or less positive elevation angle.

Furthermore, the longitudinal axis 28 of the automobile 20 also establishes a reference for the yaw of the headlamps 16, 18. More specifically, the angle in a plane parallel to the ground between the beam from a headlamp 16, 18 and the longitudinal axis 28 defines the yaw angle of the headlamp 16, 18.

In the presently preferred embodiment, the automobile 20 includes a power train 30 and a plastic body 32 mounted on the steel frame 34. Details of the automobile 20 are disclosed in the above-referenced patent application. As disclosed in the above-referred to application, the automobile body 32 is made by injection molding of a fiberglass-reinforced plastic composite engineering material.

Figure 3:
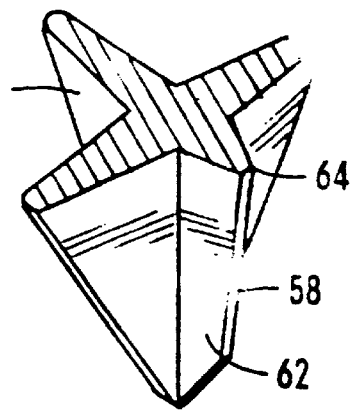
FIG. 3 is a perspective cross-sectional view of the headlamp housing clamping rib, as seen along the line 3—3 in FIG. 2.
Figure 4:
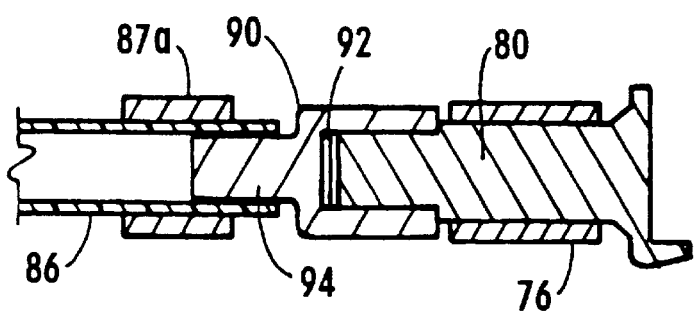
FIG. 4 is a cross-sectional view of the activating shaft, as would be seen along the line 4—4 in FIG. 2 with the components cooperatively engaged.
Figure 2:
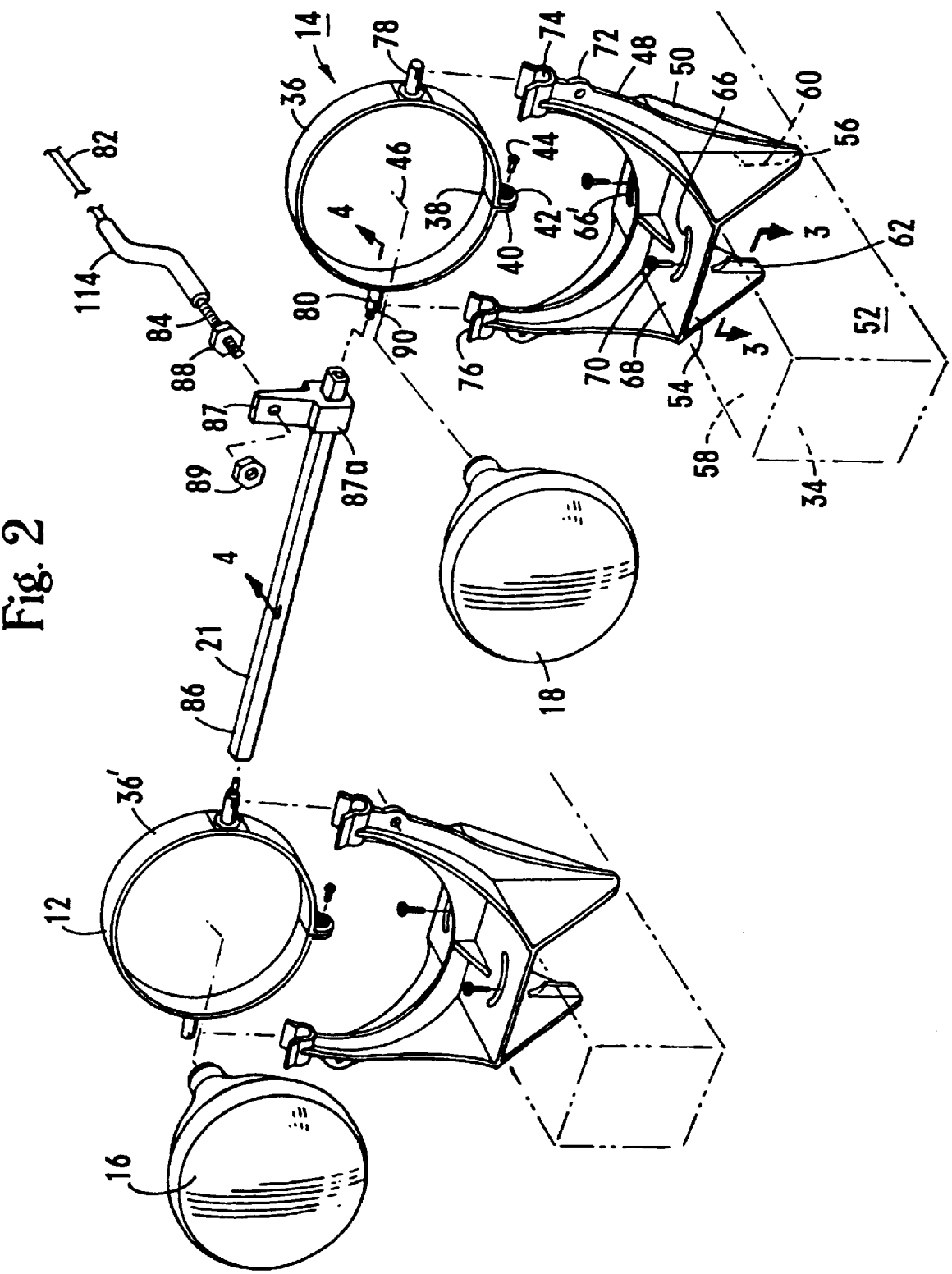
FIG. 2 is an exploded perspective view of the headlamp holders with actuator, with portions of the frame shown in phantom.

FIGS. 2–4 show the details of the headlamp holders 12, 14 and actuator 21 of the present invention. For simplicity of disclosure, the left holder 14 will be discussed. It is to be understood, however, that the right headlamp holder 12 is in all essential respects identical in configuration and operation to the left holder 14, and indeed is interchangeable with the left holder 14.

As shown best in FIG. 2, the left holder 14 includes an injection molded plastic headlamp housing 36 for holding the right headlamp 16. As shown, the headlamp housing 36 is circularly configured for surroundingly engaging the headlamp 16. To provide a means for disengaging and securely engaging the housing 36 with the headlamp 16, the housing 36 is formed with a discontinuity 38 that defines opposed ends 40, 42.

Each end 40, 42 is configured as a fastener fitting, and a screw 44, preferably a self-threading screw, can be engaged with the ends 40, 42 and manipulated to vary the distance between the ends 40, 42. Accordingly, the housing 36 can be moved between an enlarged configuration, wherein the ends 40, 42 are spaced from each other and the housing 36 can be positioned around the periphery of the headlamp 16, and a hold configuration, wherein the ends 40, 42 are closely juxtaposed with each other and the housing 36 firmly grips the periphery of the headlamp 16 in an interference fit.

FIG. 2 further shows that the housing 36 defines a light beam axis 46. It is to be understood that when the housing 36 is engaged with the headlamp 16, the axis 46 is the axis of the light beam produced by the headlamp 16.

Additionally, an injection molded plastic base 48 is formed with a downwardly-depending positioning member, referred to herein for brevity as a "clamp" 50, for engaging a headlamp support element of the automobile 20. In the presently preferred embodiment, the headlamp support element is a rail 52 of the frame 34 shown in FIG. 1, and the rail 52 is parallel to the long axis 28 of the automobile 20.

As more fully disclosed below, the base 48 holds the headlamp housing 36 to permit one degree of motion of the housing 36 relative to the base 48. More specifically, as further disclosed below the base 48 holds the housing 36 to permit pivotable motion of the housing 36 relative to the base 48 only in the elevational (i.e., pitch) dimension of the automobile 20.

As shown in FIG. 2, the clamp 50 of the base 48 is configured as a bracket having first and second clamping legs 54, 56 for straddling the frame rail 52. The first and second clamping legs 54, 56 define respective first and second clamping surfaces 58, 60 (surface 60 shown in phantom), with each clamping surface 58, 60 being oriented toward the frame rail 52.

Taking the first clamping leg 54 as an example, the clamping surface 58 of the first clamping leg 54 is formed with a non-planar clamping rib 62 that abuts the frame rail 52. Referring briefly to FIG. 3, the clamping rib 62 is generally wedge-shaped, and is formed with a gently rounded and thus non-planar apex 64. The apex 64 of the clamping rib 62 establishes the clamping surface 58, and thus abuts the frame rail 52. It is to be understood that the second clamping leg 56 is in all essential respects identical in configuration to the first clamping leg 54.

Referring back to FIG. 2, the distance between the clamping legs 54, 56 is about equal to the width of the straddled frame rail 52. Further, the clamping legs 54, 56 are materially biased slightly toward each other, to consequently establish an interference fit between the clamping ribs of the clamp 50 and the frame rail 52.

As shown in FIG. 2, an arcuate front slot 66 is formed on a horizontal flange 68 of the base 48. An internally threaded hole or boss (not shown) is formed in the frame rail 52, and a screw 70 is threadably engaged with the hole or boss, with the shank of the screw 70 extending through the slot 66. Likewise, a back slot 66' with associated screw can be formed in the base 48.

With this combination of structure, it readily can be appreciated that the yaw orientation of the base 48 relative to the frame rail 52 and, hence, relative to the long axis 28 of the automobile 20 is established by appropriately pivotably manipulating the base 48 on the frame rail 52 in a plane parallel to the ground. As the base 48 is manipulated on the frame rail 52, the non-planar clamping ribs essentially roll against the frame rail 52, and contact is maintained between the clamping ribs and the frame rail 52. Also, as the base 48 is manipulated, the slot 66 of the base 48 rides past the screw 70. When the desired yaw angle is established, the screw 70 is tightened to inhibit relative motion between the base 48 and the frame rail 52 and thereby maintain the yaw angle.

Still referring to FIG. 2, the base 48 is formed with a support 72 for pivotably engaging the headlamp housing 36. The support 72 defines a semicircle having a diameter slightly larger than the diameter of the headlamp housing 36. As shown in FIG. 2, the semicircle defined by the support 72 establishes two ends that terminate in respective generally transversely-oriented channels 74, 76. In accordance with the present invention, the headlamp housing 36 is formed with opposed horizontal, generally transversely-oriented hollow cylindrical dowels 78, 80 for snapping into the respective channels 74, 76 and rotatably engaging the respective channels 74, 76. This combination of structure facilitates pivotable movement of the headlamp housing 36 relative to the base 48 in the elevational (i.e., pitch) dimension of the automobile 20.

Turning now to the details of the actuator 21 shown in FIG. 1, FIG. 2 best shows that the actuator 21 includes an elongated solid metal activating rod 82 which has a threaded front segment 84. The front segment 84 of the activating rod 82 is connected to an elongate, transversely-disposed hollow parallelepiped-shaped activating shaft 86. More particularly, the activating rod 82 is connected to an ear 87, and the ear 87 has a base 87a formed with a parallelepiped-shaped channel for closely receiving the shaft 86 therethrough. Thus, the base 87a of the ear 87 may be positioned anywhere along the shaft 86 to avoid interference with other components of the automobile 20.

As shown, the ear 87 protrudes radially outwardly from the shaft 86. Preferably, the activating rod 82 is a slightly flexible one-eighth inch ($\frac{1}{8}$") diameter solid metal rod, although the activating rod 82 could be, e.g., a one-sixteenth inch ($\frac{1}{16}$") diameter metal cable. To hold the rod 82 in engagement with the ear 87 and, hence, the shaft 86, first and second limiter nuts 88, 89 are threadably engaged with the front segment 84 with the ear 87 sandwiched between the nuts 88, 89.

In accordance with the principles of the present invention, the shaft 86 is connected to the headlamp housing 36. Preferably, as best shown in FIG. 4 a cylindrical-to-rectangular adapter 90 is formed with a cylindrical channel 92 for closely receiving the dowel 80 therein in an interference fit therewith. Also, the adapter 90 is formed with a parallelepiped-shaped extension 94 which is received in the hollow actuating shaft 86. Thereby, the shaft 86 is coupled to the housing 36. It is to be appreciated that the shaft 86 is likewise coupled to the housing of the right headlamp holder 12.

Accordingly, it may now be appreciated that translational movement of the activating rod 82 along the long axis 28 of the automobile 20 is transformed to rotational motion of the shaft 86 about its long axis. In turn, rotational motion of the shaft 86 about its long axis causes pivotable movement of the housing 36 relative to the base 48. As stated above, the shaft 86 is likewise connected to a headlamp housing 36' of the right holder 12. Consequently, by appropriately moving the activating rod 82, the elevation angle α of the headlamps 16, 18 can be established. If desired, a hollow plastic sheath 114 (FIG. 2) can be positioned around bent segments of the rod 82 to support the bent segments.

Figure 5:
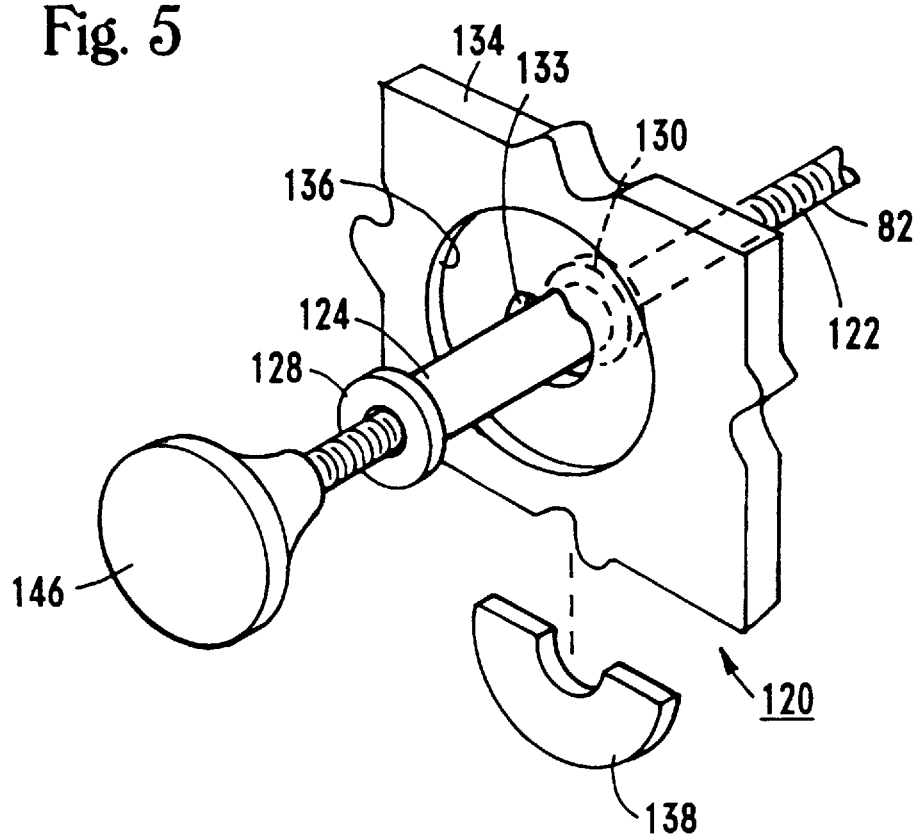
FIG. 5 is a partially exploded perspective view of the head beam elevation angle adjustor of the present invention, with the spool intermediate the high and low beam positions, portions of the dashboard broken away, and portions shown in phantom.
Figure 6:
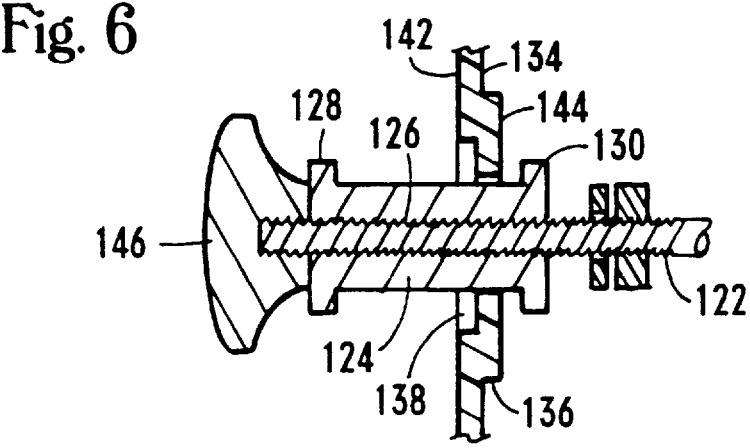
FIG. 6 is a cross-sectional view of the elevation angle adjustor as would be seen along the line 6—6 in FIG. 5.

FIGS. 5 and 6 show the details of an actuator, generally designated 120, for manipulating the activating rod 82. As shown, the actuator 120 is connected to a rear end segment 122 of the activating rod 82. As intended by the present invention and disclosed in detail below, the actuator 120 can be grasped by an occupant of the automobile 20 and manipulated to move the activating rod 82 to thereby cause pivotal motion of the headlamps 16, 18 relative to the automobile 20.

FIGS. 5 and 6 show that in the presently preferred embodiment, the rear end segment 122 of the activating rod 82 is threaded. Additionally, a hollow rigid plastic spool 124 is formed with a threaded inner surface 126 for threadably engaging the spool 124 with the rear end segment 122.

As shown, the spool 124 is formed with a front disc-shaped flange 128 and a rear disc-shaped flange 130. Both flanges 128, 130 protrude radially outwardly from the threaded inner surface 126 of the spool 124. As intended by the present invention, the distance between the flanges 128, 130 establish a mechanical memory for the high and low beam orientations of the headlamps 16, 18. In other words, the relative difference between the high and low beam orientations of the headlamps 16, 18 is established by the distance between the flanges 128, 130 of the spool 124.

The spool 124 extends through an opening 133 of the dashboard 134 of the automobile 20, with the flanges 128, 130 positioned on opposite sides of the dashboard 134 from each other. The opening 133 defines a recess 136, and as best shown in FIG. 6, a crescent-shaped mounting bracket 138 is positioned in the recess 136 so as to be flush with the dashboard 134. In the presently preferred embodiment, the mounting bracket 138 is affixed to the dashboard 134 by two screws (not shown) to hold the spool 124 in slidable engagement with the dashboard 134.

As shown best in FIG. 6, the dashboard 134 defines a front surface 142 and a rear surface 144. Preferably, a manipulable plastic operator, such as, e.g., an operating knob 146, is attached to the rear end of the activating rod 82 by means well-known in the art, e.g., threading or solvent bonding the knob 146 to the rod 82.

With this disclosure in mind, it may now be appreciated that the operating knob 146 can be pushed toward the dashboard 134 to cause the front flange 128 of the spool 124 to abut the front surface 142 of the dashboard 134. Thereby, a low beam position of the actuator 120 is established. As intended by the present invention, the low beam position of the actuator 120 corresponds to a low beam orientation of the headlamps 16, 18. In the low beam orientation, it will be appreciated that the elevation angle α (FIG. 1) of the headlamps 16, 18 is small or indeed negative, in which case the headlamps 16, 18 direct their respective beams toward the ground.

It may now be further appreciated that the operating knob 146 can be pulled away from the dashboard 134 to cause the rear flange 130 of the spool 124 to abut the rear surface 144 of the dashboard 134. Thereby, a high beam position of the actuator 120 is established. This high beam position of the actuator 120 corresponds to a high beam orientation of the headlamps 16, 18, in which the elevation angle α of the headlamps 16, 18 is greater than it was in the low beam orientation.

As the skilled artisan will recognize, the spool 124 can be rotated by an occupant of the automobile 20 to cause the spool 124 to travel translationally relative to the activating rod 82, owing to the threadable engagement therebetween. Consequently, by rotating the spool 124, an occupant can selectively establish the high beam position of the actuator 120 and, owing to the mechanical memory afforded by the spool 124, the low beam position as well. Thus, the high and low beam orientations of the headlamps 16, 18 can be established.

While the particular MULTIDIRECTIONAL HEADLAMP MOUNT WITH MANUALLY ADJUSTABLE ELEVATION ANGLE as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A mount for holding a headlamp of an automobile having a headlamp support element, comprising:

a headlamp housing for holding the headlamp, the headlamp housing defining a light beam axis;

a base formed with a clamp for engaging the headlamp support element, the clamp defining a yaw angle relative to the headlamp support element, the clamp having clamping legs materially biased to establish an interference fit between the clamp and the headlamp support element, each clamping leg being formed with a respective non-planar clamping rib abutting the headlamp support element to permit selectively establishing the yaw angle and a support configured for pivotally engaging the headlamp housing; and an actuator coupled to the headlamp housing and reciprocatingly disposed on the automobile, the actuator being configured for transforming translational motion of the actuator to pivotal motion of the headlamp housing, such that the actuator can be moved to pivot the headlamp housing to a low beam orientation, wherein a first elevation angle is established between the light beam axis and the ground directly beneath the mount, and a high beam position, wherein a second elevation angle is established between the light beam axis and the ground directly beneath the mount.

2. The mount of claim 1, wherein the second elevation angle is higher than the first elevation angle, and wherein the headlamp housing and base are made of injection-molded plastic.

3. The mount of claim 2, wherein the headlamp support element is a frame rail of the automobile, and the clamp of the base is a bracket having first and second clamping legs for straddling the frame rail therebetween, the first and second clamping legs defining respective first and second clamping surfaces, each clamping surface being oriented toward the frame rail.

4. The mount of claim 3, further comprising at least one fastener engaged with the clamp and the frame rail to inhibit relative motion between the clamp and frame rail and thereby maintain the yaw angle.

5. The mount of claim 3, wherein the support of the base generally defines a semicircle having two ends terminating in respective channels, and the headlamp housing is formed with opposed dowels for rotatably engaging respective channels.

6. The mount of claim 5, wherein the actuator includes:

an activating rod;

an activating shaft connected to the headlamp housing; and an ear formed on the activating shaft and extending radially away therefrom, the ear being connected to the activating rod such that translational motion of the activating rod is transformed to rotational motion of the activating shaft and headlamp housing.

7. The mount of claim 6, further comprising a sheath disposed around at least a segment of the activating rod.

8. The mount of claim 6, wherein the headlamp housing and base are a first headlamp housing and base, respectively, of a headlamp mounting system, the headlamp is a first headlamp, and the headlamp mounting system further comprises a second headlamp housing and second base for holding a second headlamp, the second headlamp housing and second base being substantially identical in configuration and operation to the first headlamp and first base, respectively, the activating shaft being connected to the second headlamp housing.

9. A method for selectively establishing the elevation angle of a headlamp relative to an automobile from inside a passenger compartment of the automobile, comprising the steps of:

(a) attaching the headlamp to a headlamp housing;

(b) pivotally engaging the headlamp housing with a base including at least one clamping surface;

(c) attaching the base to the automobile;

(c1) pivoting the base relative to the automobile to cause preselected portions of the clamping surface to contact the automobile and thereby establish a predetermined yaw angle of the base with respect to the automobile;

(d) coupling an operating member to the headlamp housing; and (e) selectively manipulating the operating member from inside the passenger compartment to pivot the headlamp housing relative to the base and thereby establish a desired elevation angle of the headlamp relative to the automobile.

10. The method of claim 9, further comprising the steps of:

forming the base with a bracket having two opposed inwardly-oriented non-planar clamping surfaces;

positioning the bracket on the automobile in a straddling relationship therewith, with a portion of each clamping surface abutting the automobile; and affixing the base to the automobile to inhibit pivotal motion of the base relative to the automobile to thereby maintain the predetermined yaw angle.

\* \* \* \* \*